May 31, 1955  N. CZAJKOWSKI  2,709,782

TRANSLATOR DRIVE AND CLUTCH SYNCHRONIZING MECHANISM

Filed May 22, 1953

INVENTOR
N. CZAJKOWSKI

BY

ATTORNEYS

May 31, 1955  N. CZAJKOWSKI  2,709,782
TRANSLATOR DRIVE AND CLUTCH SYNCHRONIZING MECHANISM
Filed May 22, 1953  6 Sheets-Sheet 2

INVENTOR
N. CZAJKOWSKI

BY
*G. D. O'Brien*
*R. M. Hicks*
ATTORNEYS

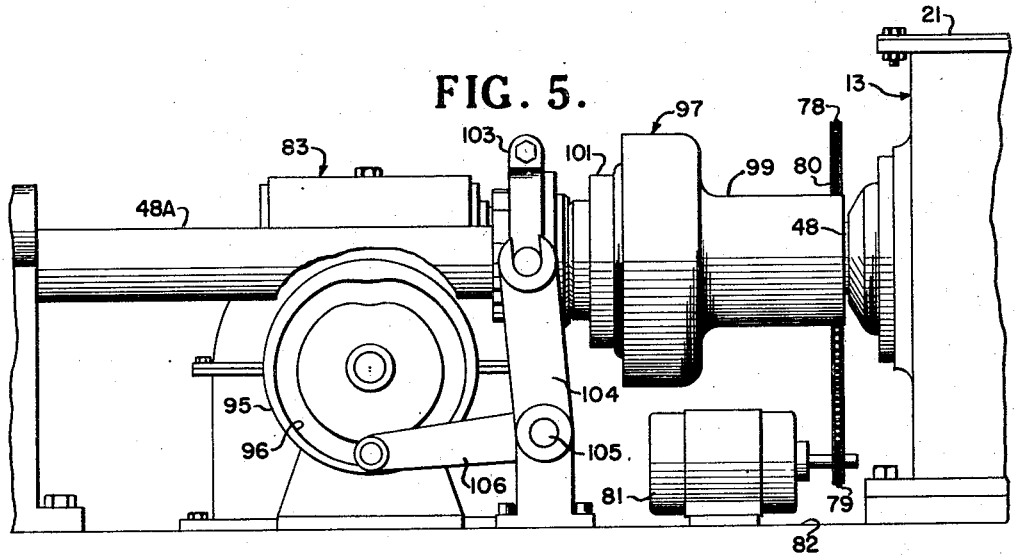
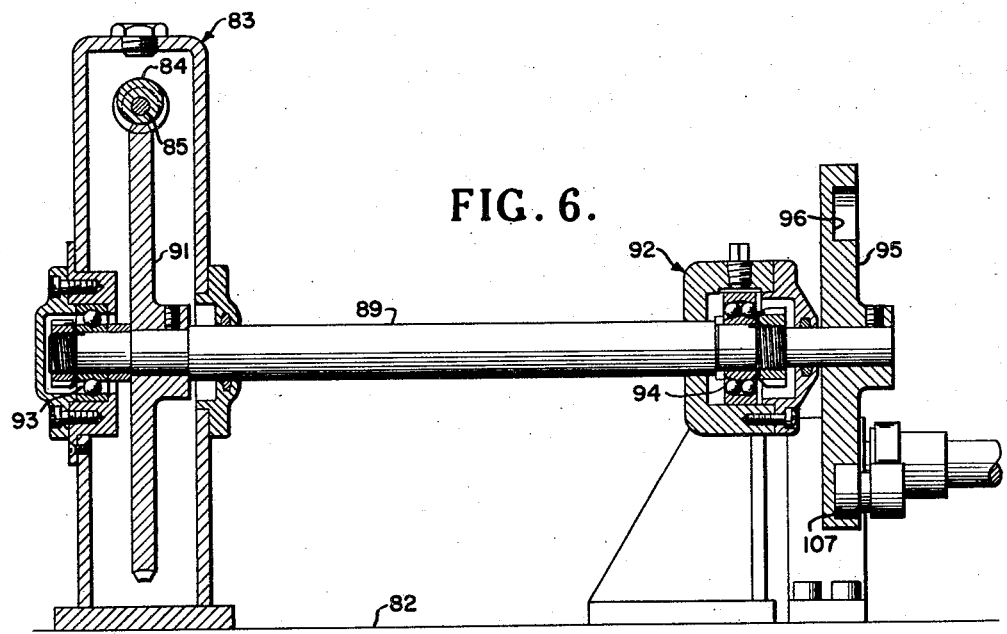

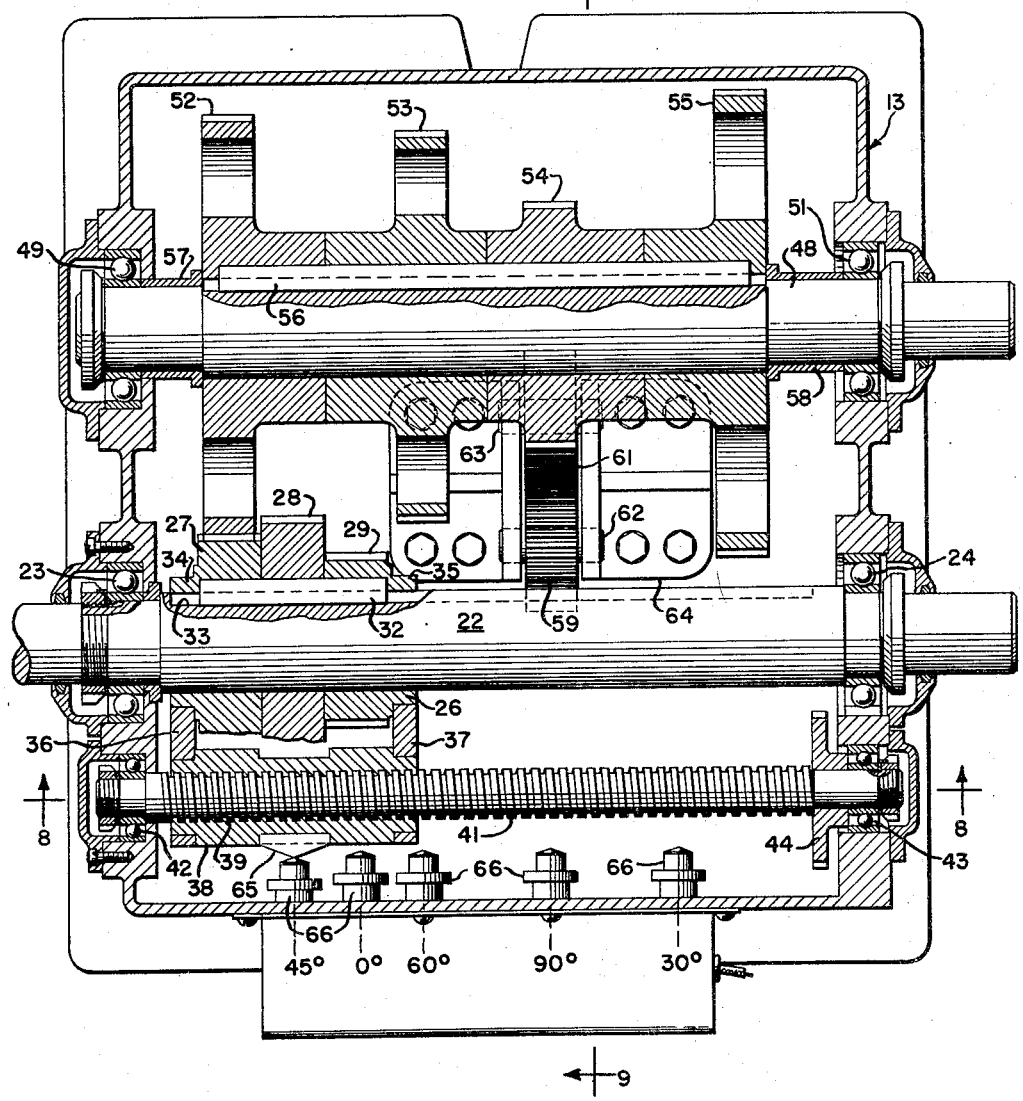

May 31, 1955  N. CZAJKOWSKI  2,709,782
TRANSLATOR DRIVE AND CLUTCH SYNCHRONIZING MECHANISM
Filed May 22, 1953  6 Sheets-Sheet 5

INVENTOR
N. CZAJKOWSKI
BY
ATTORNEYS

INVENTOR
N. CZAJKOWSKI

# United States Patent Office 2,709,782
Patented May 31, 1955

2,709,782

TRANSLATOR DRIVE AND CLUTCH SYNCHRONIZING MECHANISM

Norman Czajkowski, Takoma Park, Md., assignor to the United States of America as represented by the Secretary of the Navy Application May 22, 1953, Serial No. 356,920

8 Claims. (Cl. 324—43)

(Granted under Title 35, U. S. Code (1952), sec. 266)

The invention described herein may be manufactured and used by or for the Government of the United States of America for governmental purposes without the payment of any royalties thereon or therefor.

The present invention relates to a translator drive and clutch synchronizing mechanism. More particularly, the invention relates to a remote-controlled gear ratio changing transmission having a clutch synchronized to disengage as the gears are shifted into each ratio and to engage after each shift has been completed.

The translator drive of the present invention preferably is employed to drive translationally a coil for detecting the magnetic signatures of ship models and other ordnance devices where the recording of such signatures is desired. The gear changing transmission of the present invention is employed to vary the relative speed of a driven shaft which is used to drive the detector mechanism translationally in one path while the drive shaft, which is driven at a substantially constant speed, is used to drive the detector mechanism translationally in a path at right angles to the first path. It will thus be seen that by changing the gear ratio between the drive shaft and the driven shaft, the detector mechanism is caused to move at angles, variable in accordance to changes in gear ratio, the motion being with respect to a model which is mounted in a substantially fixed position.

An object of the present invention is to provide a variable ratio transmission and clutch mechanism for driving a magnetic detector translationally with respect to a magnetic body wherein the angle of motion thereof may be varied in accordance with a selected gear ratio of the transmission.

Another object of the invention is to provide a new and improved variable ratio transmission and clutch mechanism for driving a magnetic detector translationally with respect to a magnetic body wherein the clutch operating mechanism is synchronized with the gear shifting mechanism to facilitate the operation thereof.

Still another object is to provide a novel drive for a translator mechanism wherein predetermined angles of motion may be selected at will.

Other objects and many of the attendant advantages of this invention will be readily appreciated as the same becomes better understood by reference to the following detailed description when considered in connection with the accompanying drawings wherein:

Fig. 5 is a view in side elevation of the clutch operating mechanism;

Fig. 6 is a sectional view taken along the line 6—6 of Fig. 1;

Fig. 7 is a sectional plan of the transmission;

Figure 1:
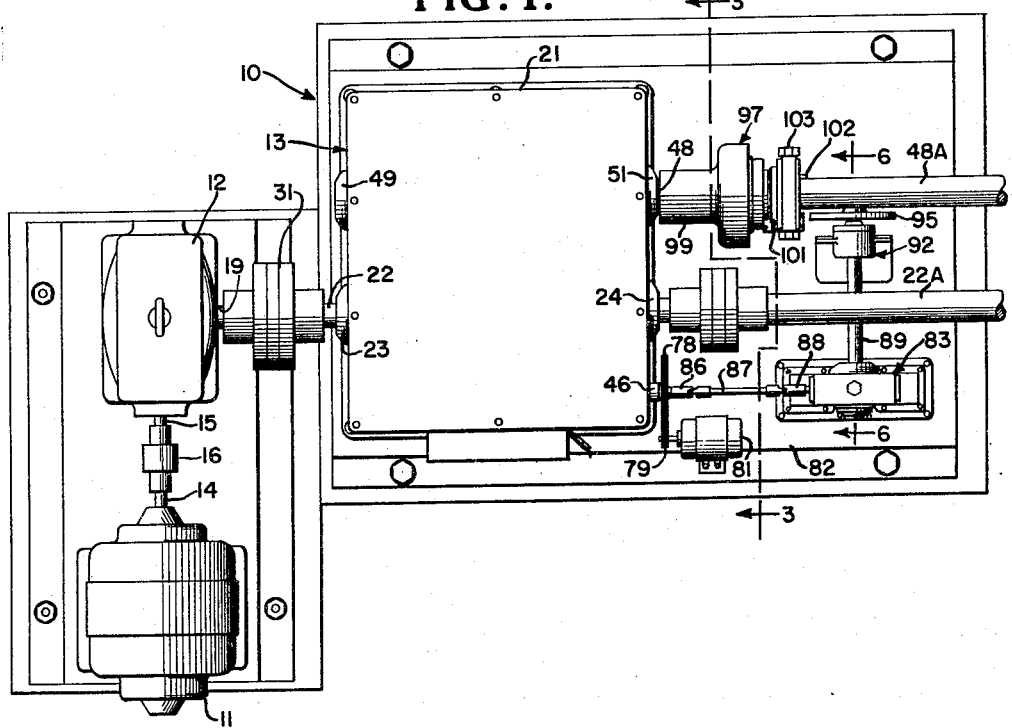
Fig. 1 is a top plan view of the apparatus of the present invention.
Figure 2:
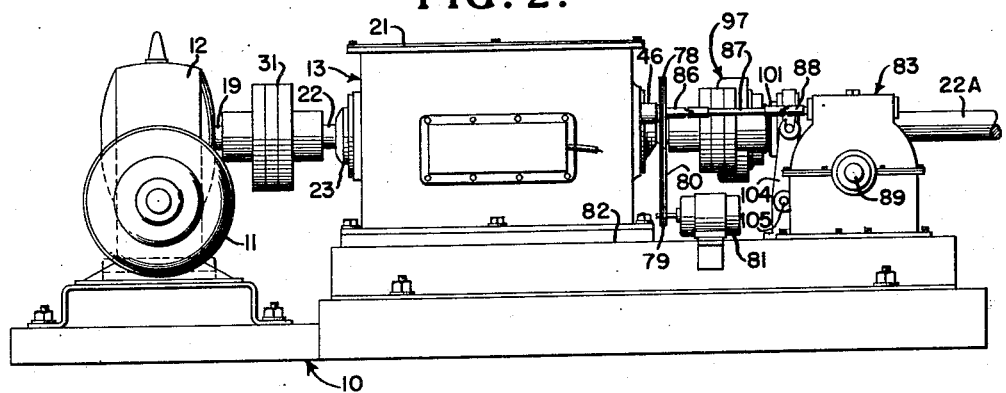
Fig. 2 is a side elevational view thereof.
Figure 3:
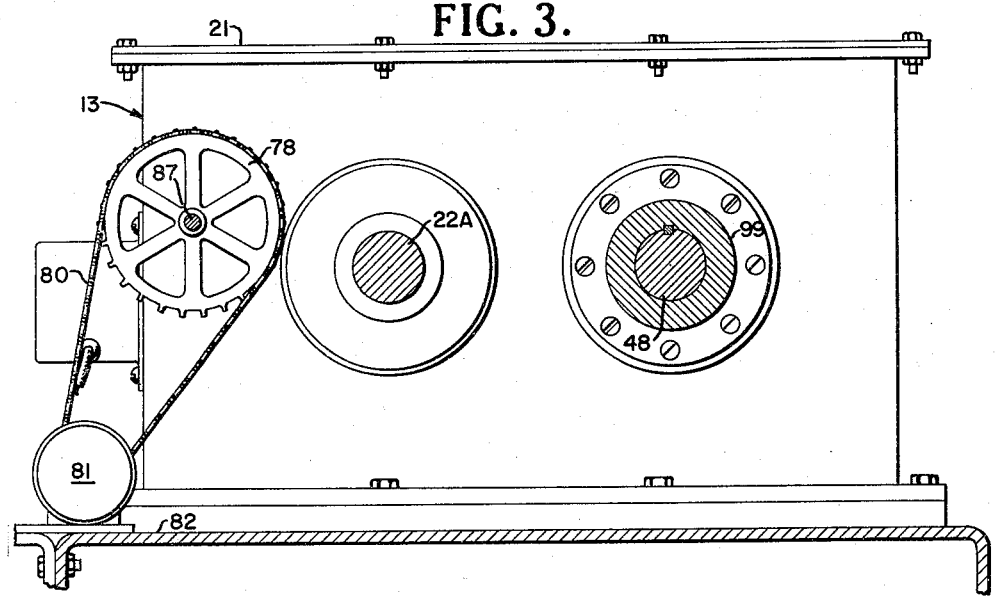
Fig. 3 is a sectional view taken along the line 3—3 of Fig. 1.
Figure 4:
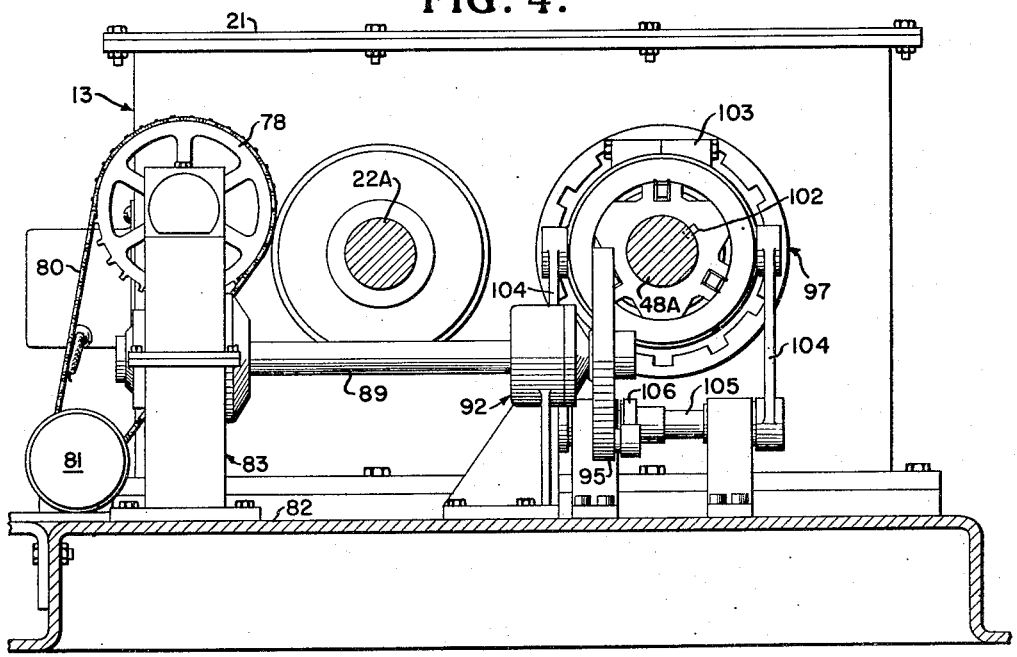
Fig. 4 is an end elevation of the transmission and clutch mechanism the shafts being shown in section.
Figure 8:
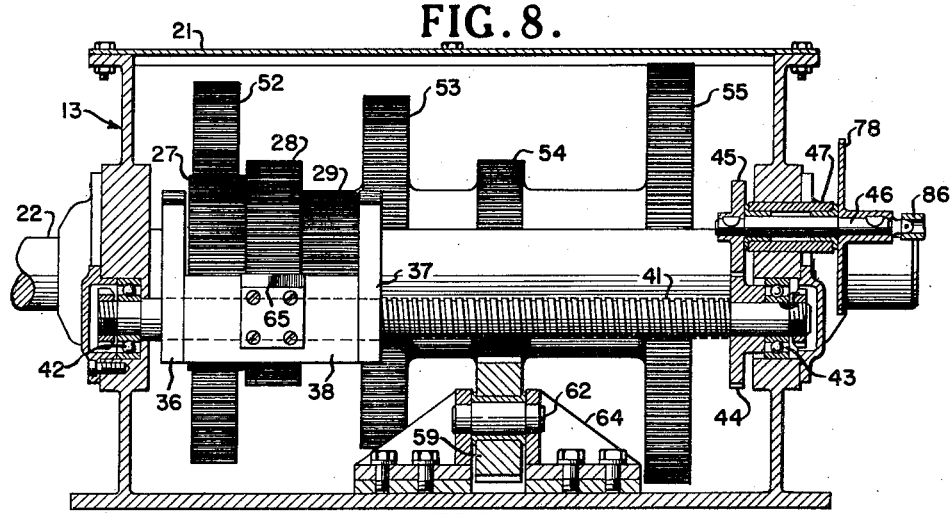
Fig. 8 is a sectional view taken along the line 8—8 of Fig. 7.
Figure 9:
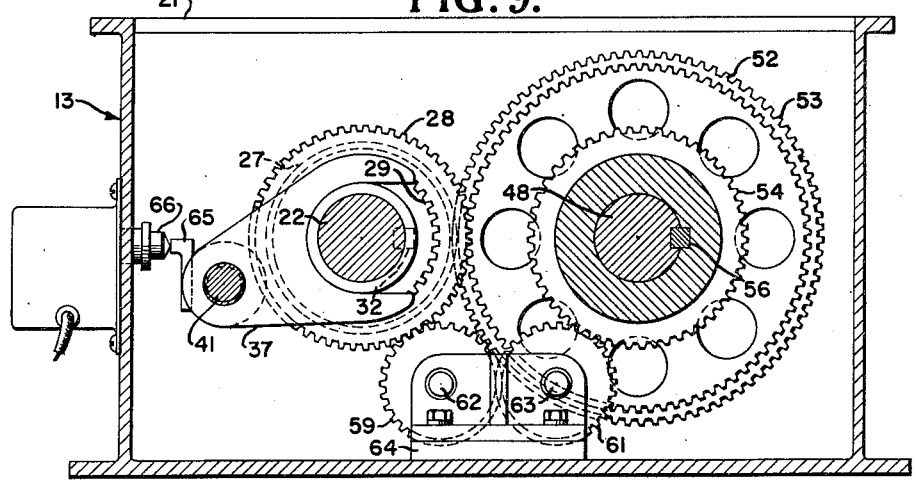
Fig. 9 is a sectional view taken along the line 9—9 of Fig. 7.

Referring more particularly to the drawings wherein like numerals indicate like parts throughout the several views, 10 indicates generally the device of the present invention, an electric motor being indicated generally at 11 and a reduction gear at 12 while 13 indicates generally a gear changing transmission. Motor 11 is provided with a drive shaft 14 and is connected to shaft 15 of reduction gear 12 by a coupling 16. Reduction gear 12 is of a conventional type having a worm (not shown) mounted on shaft 15 and meshing with a worm wheel (not shown) mounted on shaft 19, shaft 19 being mounted at right angles to shaft 15.

Transmission 13 is provided with a casing 21, a shaft 22 extending therethrough and being mounted in ball bearings 23 and 24. Mounted on shaft 22 is a gear cluster 26 comprising gears 27, 28 and 29. Shaft 22 is driven by shaft 19 through a flexible coupling 31. Gears 27, 28 and 29 of cluster 26 are slidably keyed to shaft 22 by a key 32 which rides in keyway 33 of shaft 22. Gears 27 and 29 are provided with reduced end portions 34 and 35, respectively, which engage forks 36 and 37 of a shifter member 38. Shifter member 38 is internally threaded at 39 to receive the feed screw 41 mounted in bearings 42 and 43 in casing 21.

Drive gear 44 is fixed on feed screw 41 and meshes with gear 45 fixed on shaft 46 which extends through sleeve bearing 47 in casing 21.

Mounted substantially parallel to shaft 22 is a countershaft 48 supported in ball bearings 49 and 51. Gears 52, 53, 54 and 55 are mounted on shaft 48 and fixed thereto by key 56 for rotation therewith. Sleeves 57 and 58 are interposed between gear 52 and bearing 49 and gear 55 and bearing 51, respectively, to prevent endwise movement of the gears. Gear 54 is in constant mesh with one of a pair of idler gears 59 and 61.

Gears 59 and 61 are supported on shafts 62 and 63 respectively which are fixed in supporting brackets 64 secured to the bottom of casing 21.

Gears 52, 53, 54 and 55 are spaced to provide preferably four equally spaced gear-engaging positions to which the gear cluster 26 may be moved by turning the feed screw 41 a predetermined number of revolutions to engage progressively each of the aforementioned gears and to enter a neutral position midway between two of the gear-engaging positions, namely between gears 52 and 53.

A cam member 65 is fixed to shifter member 38 and successively engages each of a plurality of plungers 66. Each of the plungers 66 when engaged by cam 65 moves to close one of a plurality of switches 67, 68, 69, 71 and 72, switch 67 being closed when gear 27 is in mesh with gear 52, switch 68 being closed when the gears are disengaged and in a neutral position, switch 69 being closed when gear 28 meshes with gear 53, switch 71 being closed when gear 28 meshes with gear 61, and switch 72 being closed when gear 29 meshes with gear 55. Each of the switches 67, 68, 69, 71 and 72 is connected respectively through energizing circuit 78 to one of a plurality of dial lights 73, 74, 75, 76 and 77 suitably marked to indicate the selective position of the gears. A sprocket 78 is fixed on shaft 46 exteriorly of casing 21 and is connected by chain 80 with sprocket 79 of a reversible shifter drive motor 81 mounted on a base 82 which also supports casing 21.

A reduction gear, indicated generally at 83, is mounted on base 82 and has a worm 84 fixedly mounted on shaft 85 and driven by motor 81 through universal joint 86 attached to shaft 46, shaft 87 and universal joint 88. A shaft 89 mounted at right angles to shaft 85 has a worm wheel 91 mounted thereon which is driven by worm 84. Shaft 89 extends outwardly of reduction gear 83 and is supported adjacent the outer end thereof by a bearing support 92. Shaft 89 may be suspended in ball or roller bearings 93 and 94 adjacent the ends thereof. Keyed on shaft 89 adjacent support 92 is a disk 95 having an eccentric groove 96 formed in one face thereof.

A clutch mechanism indicated generally at 97 is mounted on shaft 48 and is employed to disconnect shaft 48 from shaft 48A when the gears of transmission 23 are shifted. While the clutch shown in the drawings is of a well-known multiple-disk type, it is understood that any clutch suitable for the purpose may be employed. Casing 99 is fixed to shaft 48 while movable element 101 is slidably mounted on shaft 48A and rotatable therewith, such operation being accomplished by a key 102 or if desired by a spline (not shown). It is, of course, understood that movement of the clutch element 101 in a direction toward casing 99 causes engagement of the clutch and thus causes shafts 48 and 48A to rotate together, while movement of element 101 in the opposite direction causes disengagement of the clutch and disconnects shaft 48 from shaft 48A.

In order to accomplish the operation of clutch 97, there is provided a collar 103 which is engaged by fork members 104 fixedly mounted on shaft 105. Extending outwardly from shaft 105 is an arm 106 which has mounted thereon a roller 107 arranged to ride in cam groove 96 of disk 95. From the foregoing it will be seen that rotation of disk 95 will move clutch 97 through arm 106 and fork members 104, into and out of engagement, thus to connect or disconnect shafts 48 and 48A during a portion of each revolution of disk 95. Rotation of disk 95 is synchronized with movement of shifter member 38 thus to ensure that clutch 97 is disengaged during shifting operations and engaged in each of the gear engaging or gear-meshing positions, one revolution of disk 95 occurring during movement of shifter member 38 from the "on center" of one gear-meshing position to the "on center" of the next adjacent gear-meshing position. It is, of course understood that the shifter 38 may be moved continuously or in steps from one end to the other end of feed screw 41. Shifter motor 81, being reversible, drives shifter 38 and eccentric disk 95 in either direction to accomplish the gear shifting and the clutching and declutching operations. It is, of course, understood that limit switches 67 and 72 may be provided to stop motor 81 as shifter 38 reaches the ends of the feed screw 41, as will be hereinafter more fully described.

Figure 10:
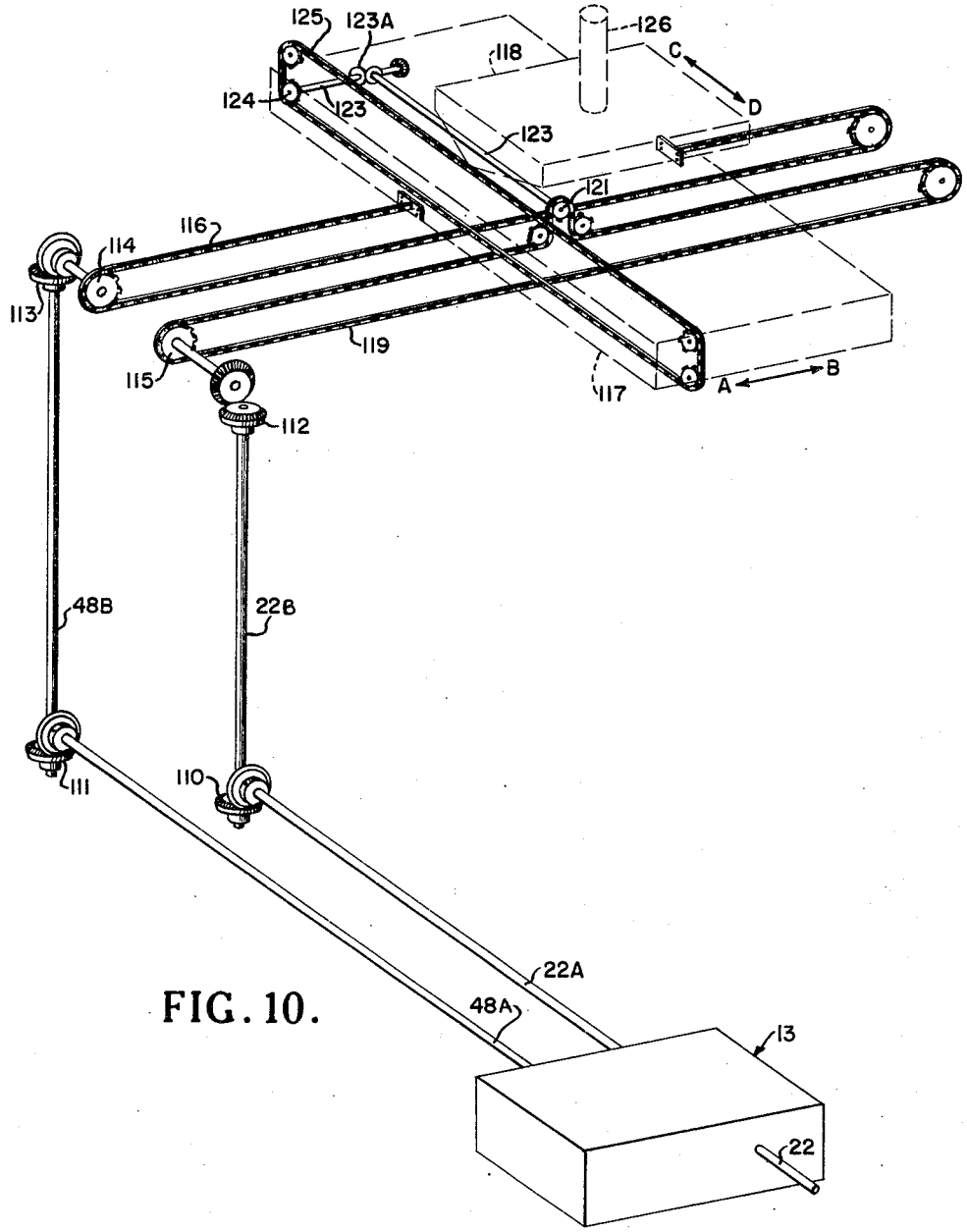
Fig. 10 is a schematic perspective view of a translator mechanism employing the transmission and clutch mechanism of the present invention.

Referring particularly to Fig. 10 wherein is shown in schematic perspective the transmission and clutch synchronizing mechanism of the present invention together with the additional apparatus including the shafting, gearing and chain drives employed to drive the detector coil translationally at predetermined angles on a single plane with respect to a magnetic ship model or other such device. The aforementioned additional apparatus is disclosed in greater detail in the copending application of C. L. Parsons for Sprocket and Chain System, Serial No. 356,913 filed May 22, 1953. As shown, shaft 22A and 48A, which are continuation of shafts 22 and 48, respectively, extend horizontally a distance sufficient to keep the motors 11 and 81 and other magnetic materials used in the clutch and transmission mechanisms out of the detecting range of the detector coil. Shafts 22A and 48A transmit rotary motion to vertical shafts 22B and 48B, respectively, through bevel gear set 110 in the case of shafts 22A and 22B and bevel gear set 111 in the case of shafts 48A and 48B. Mounted on the upper end of shaft 22B is a bevel gear set 112 while shaft 48B has mounted on the upper end thereof a bevel gear set 113. Gear set 113 drives a sprocket 114 while gear set 112 drives sprocket 115. A chain 116 is driven by sprocket 114 and moves translationally in directions A—B a carriage 117. Supported on carriage 117 is a carriage 118 which is driven in directions C—D or 90° with respect to the movement of carriage 117 by a drive train including a chain 119 driven by sprocket 115, chain 119 driving sprocket 121 mounted on shaft 122 which is supported by carriage 117. Shaft 122 drives transverse shaft 123 through reversing bevel gear set 123A and has mounted on the end thereof sprocket 124. The reversing gear set 123A is provided to reverse the direction of travel of carriage 118 with respect to the direction of travel of carriage 117, if desired. Sprocket 124 supports chain 125 which in turn drives carriage 118 in directions C—D, as aforesaid.

A magnetic detector coil or magnetometer 126 is fixed to carriage 118 and moves therewith. It is, of course, understood that in plotting the magnetic signature of a ship model, the magnetic detector coil is passed under the stationary model at various angles and positions on a single plane. In order to cause the coil to pass under the model at a 45° angle, it being assumed that the gears of transmission 13 are in the neutral position, shifter motor 81 is energized to move gear cluster 26 in a direction toward gear 52. As gear 27 of cluster 26 approaches gear 52, clutch 97 being disengaged by operation of cam 65, shaft 48 is free of the load to facilitate engagement of gears 27 and 52. The leading or meeting ends of the teeth of all of the gears of transmission 13 are rounded or tapered to facilitate meshing thereof during the shifting operations. When gears 27 and 52 are fully meshed, clutch 97 is engaged, thus connecting shafts 48 and 48A. Also, when gears 27 and 52 are fully meshed, switch 67 is closed by cam member 65 and one of the plungers 66, thus energizing dial light 73, indicating that gears 27 and 52 are fully engaged. Shifter motor 81 is now de-energized by a relay R1 in the circuit of dial light 73 to prevent overrunning of shifter 38 on the feed screw 41, as will be hereinafter more fully described.

It is apparent that the cluster 26 may be moved by shifter motor 81 into each of the gear meshing positions to provide, for example, a travel of 45° with respect to the model of the detector coil 126, when gears 27 and 52 are engaged; to provide a travel of 0°, when the gears are in the neutral position; to provide a travel of 60°, when gears 28 and 53 are engaged; to provide a travel of 90°, when gears 28 and 61 are engaged; and to provide a travel of 30° when gears 29 and 55 are engaged.

Gears 27 and 52 provide a two to one reduction, shafts 48, 48A being driven at half the speed of shafts 22, 22A, thus carriage 117 is moved in direction A—B at half the speed of chain 119 which drives carriage 118. This two to one ratio between the speeds of carriage 117 and chain 119 causes relative motion between carriage 117 and chain 119, thus rotating sprocket 121 at a speed equal to the speed of rotation of shaft 48A thus causing carriage 118 to move in direction C—D at the same speed carriage 117 moves in direction A—B, thus providing a 45° path of travel for coil 126 with respect to the fixed ship model.

In order to provide for travel in directions C—D of the coil 126, the gears of transmission 13 are moved to the 0° or neutral position, shaft shaft 48 being disconnected from motor 11, thus only the mechanism driven by shafts 22, 22A is actuated to drive carriage 118 in directions C—D, carriage 117 being held stationary in any desired manner, there is no movement in directions A—B.

In order to provide movement in only A—B directions, the gears of transmission 13 are shifted to the 90° position wherein the gears have a 1 to 1 ratio and shafts 22A and 48A rotate at the same speed thus causing chains 116 and 119 to move in the same direction at the same speed. This produces no relative movement of chain 119 with respect to sprocket 121 and causes no movement of carriage 118, thus the coil 126 moves only in directions A—B.

In order to provide 30° and 60° movements of the coil 126 the gears of transmission 13 are shifted to the 30° and 60° positions, respectively. The 30° and 60° positions provide gear ratios sufficient to provide such movements. It is, of course, understood that other gear ratios may be provided to produce any angular movement desired for the coil 126.

Figure 11:
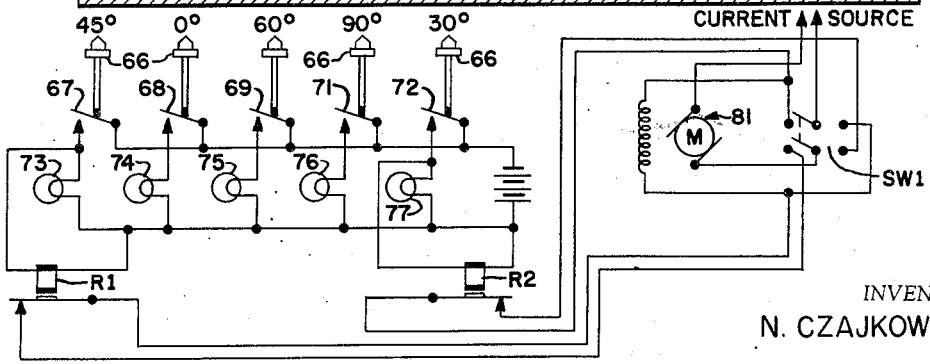
Fig. 11 is an electrical diagram of the shift position indicating and shifter motor control circuit of the present invention.

In order to prevent overrunnning of the shifter 38 on feed screw 41 at the ends thereof and with particular reference to Fig. 11, switches 67 and 72 in addition to energizing indicator lamps 73 and 77, respectively, also energize relays R1 and R2, respectively, which shut off shifter motor 81 when shifter fork 38 and gear cluster 26 reach the end positions, namely, the 45° position and the 30° position. As aforesaid when shifter fork 38 reaches the 45° position, switch 67 closes lighting indicator lamp 73 and energizing relay R1 which opens a portion of the reversing circuit of switch SW1 for shifter motor 81. In order to start motor 81 again switch SW1 is reversed causing motor 81 to run in the opposite direction, thus moving shifter yoke 38 toward the other end of feed screw 41, shifter 38 may be stopped in any of the gear energizing positions therebetween. When shifter 38 reaches the 60° position, switch 72 is closed, lighting indicator lamp 77 and energizing relay R2 which opens another portion of the reversing circuit of switch SW1 thus stopping motor 81. For motion in the opposite direction switch SW1 is reversed thus causing a reverse movement of shifter 38.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Power transmission apparatus for driving a magnetic detector device with respect to a fixedly supported magnetic model comprising, a motor, a first power train driven by said motor and driving said detector device on a first path, a second power train driving said detector device on a second path at right angles to said first path, and a selective ratio transmission interconnecting said first and second power trains whereby the speed of said second power train is varied with respect to the first power train to provide selected angular paths for said detector device.

2. Power transmission apparatus for driving a magnetic detector device with respect to a fixedly supported magnetic model comprising, a motor, a first power train driven by said motor and driving said detector device on a first path, a second power train for driving said detector device on a second path at right angles to said first path, a selective ratio transmission interconnecting said first and second power trains whereby the speed of said second power train is varied with respect to the first power train, means for shifting said transmission, and clutch means synchronized with said shifting means for interrupting one of said power trains during the shifting of said transmission.

3. Power transmitting apparatus for driving a magnetic detector device with respect to a fixedly supported magnetic model comprising, a motor, a first power train driven by said motor and driving said detector device on a first path, a second power train for driving said detector device on a second path at right angle to said first path, a selective ratio transmission interconnecting said first and second power trains whereby the speed of said second power train is varied with respect to the first power train, means for shifting said transmission to selected ratios, clutch means synchronized with said shifting means for interrupting one of said power trains while said transmission is shifted, and indicator means operated by said shifting means for indicating the selected ratios of said transmission.

4. Power transmission apparatus for driving a magnetic detector device with respect to a fixedly supported magnetic model comprising, a motor, a first shaft driven by said motor, first means connected to said first shaft for driving said detector device on a first path in a single plane, a second shaft, second means connected to said second shaft for driving said detector device on a second path in the same plane, variable transmission means driven by said first shaft and driving said second shaft providing a plurality of gear ratio changes between said first and second shafts, motor-driven means for accomplishing said gear changes, clutch operating means driven by said motor-driven means and synchronized with said gear changes whereby said second shaft is disconnected from said second means during said gear changes and engaged when each said change has been accomplished.

5. A selective gear power transmission apparatus for moving a magnetic detector device with respect to a fixedly supported magnetic model comprising, a motor, a first shaft driven by said motor, a second shaft variable ratio, gear means for selectively connecting said first shaft with said second shaft with each of a plurality of gear ratios, clutch means mounted on said second shaft and operable in synchronism with said variable gear means, means driven by said first shaft for moving said detector device in a first path on a single plane, and means driven by said second shaft for moving said detector device in a second path on the same plane.

6. A selective gear power transmission device for a magnetic detector device comprising, a first shaft, a second shaft, a first reversible motor connected to said first shaft, a transmission casing, said first and second shafts passing through said casing, a shiftable cluster of gears mounted in said casing and slidable on said first shaft into selective positions thereon, a plurality of spaced gears mounted in said casing and fixed to said second shaft, said spaced gears being adapted to be engaged selectively by said shiftable gears, a second reversible motor, shifting means operable by said second motor for sliding said shiftable gears into the selective positions thereof, indicator means for indicating at a remote position when said shiftable gears have reached each of said selective positions, a clutch mechanism for said second shaft and operable by said second motor in synchronism with said shifting means whereby the clutch is disengaged during the movement of the shiftable gears from each of said selective positions to the next adjacent said position, means operable by said first shaft for moving said detector device along a first path on one plane, and means operable by said second shaft for moving said detector device along a second path at 90° from said first path and on the same plane.

7. A selective gear power transmission apparatus for a magnetic detector device comprising, a first shaft, a second shaft, first driving means connected to said first shaft, a shiftable gear cluster slidably mounted for movement into a plurality of selective positions on said first shaft and driven thereby, a plurality of spaced gears fixed on said second shaft and adapted to be engaged selectively by said shiftable gears, shifting means engaging said shiftable gear cluster for sliding said cluster on the first shaft, a feed screw having threaded engagement with said shifting means, second driving means connected to said feed screw whereby motion is imparted to said shifter means to shift said gear cluster, a plurality of switches selectively closed by said shifting means as the shifting means moves the gear cluster into each of said selective positions, indicator means including dial lights individual to each of said switches and energized thereby as the switches are closed, a clutch mounted on said second shaft, and means driven by said second driving means for disengaging said clutch during movement of said gear cluster between each of said selective positions.

8. Apparatus for driving a magnetic detector coil translationally at selected angles comprising, a first motor, a first shaft driven by the first motor, a cluster of gears slidably mounted on said driven shaft and rotatable therewith, a second shaft adjacent said driven shaft and parallel thereto, a plurality of spaced gears fixed on said second shaft, a shifter fork engaging said cluster of gears, a feed screw operatively engaging said shifter fork for selectively sliding said cluster of gears into meshing engagement with certain of said spaced gears to provide a variety of gear ratios between the first and second shafts, the spacing of said spaced gears being such that movement of said cluster of gears from each meshing position to the next adjacent meshing position is accomplished in each case by the same number of revolutions of said feed screw, a second motor for driving said feed screw, a cam member driven by said second motor, a reduction gear interposed between said second motor and said cam member whereby the cam member rotates one revolution during said number of revolutions of the feed screw, a clutch member on said second shaft, lever means operated by said cam member for engaging and disengaging said clutch during each revolution of the cam member, means driven by first shaft of driving said detector coil along one path, and means connected to said second shaft for driving said detector coil along a second path whereby the various ratios of the gears provide a variety of angular movements of the detector coil.

References Cited in the file of this patent

UNITED STATES PATENTS

| | | |
|---|---|---|
| 815,642 | Sears | Mar. 20, 1906 |
| 841,723 | Sears | Jan. 22, 1907 |
| 1,296,164 | Corson | Mar. 4, 1919 |
| 2,161,273 | Begun | June 6, 1939 |
| 2,388,683 | Frickey et al. | Nov. 13, 1945 |